UNITED STATES PATENT OFFICE.

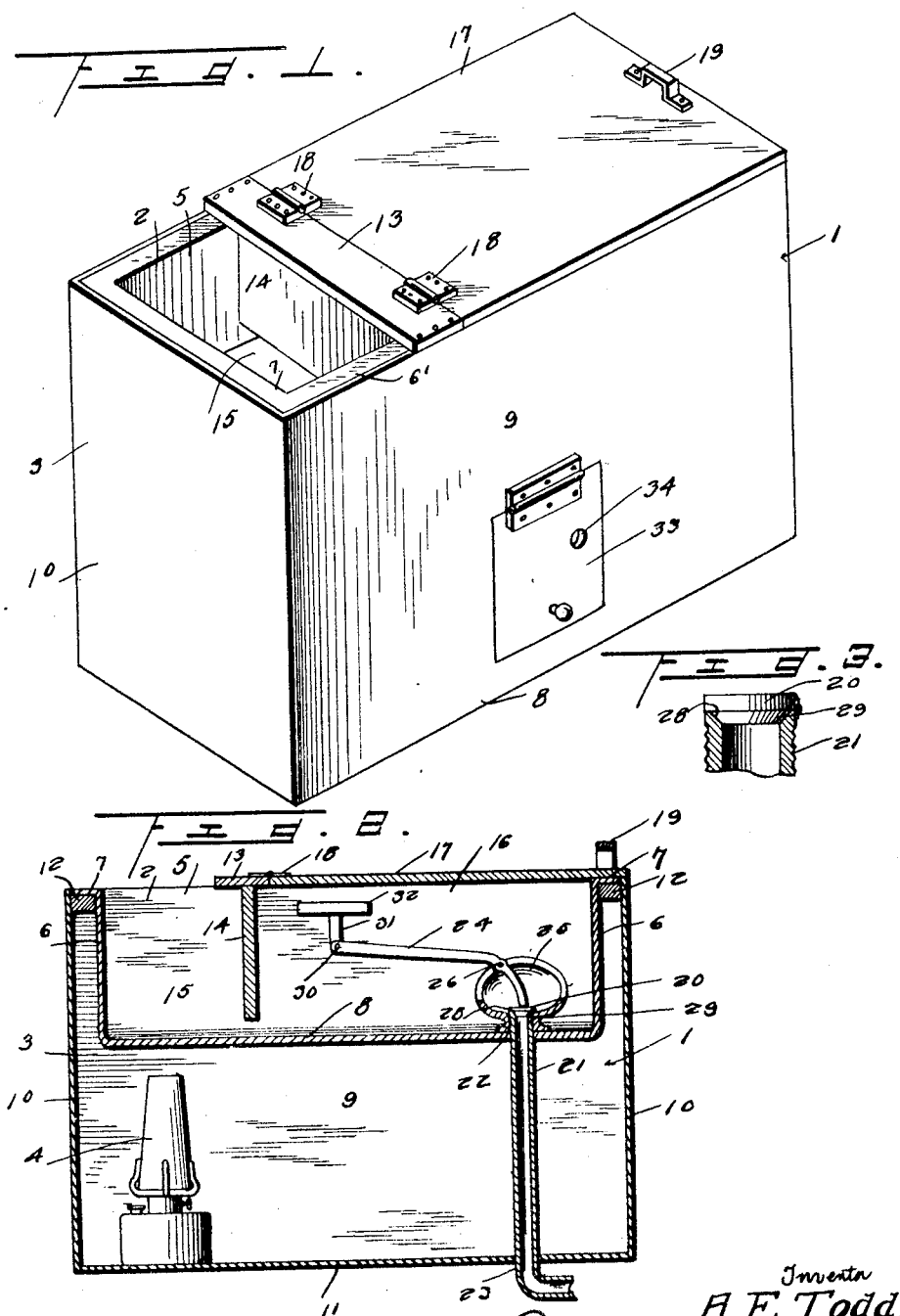

ALONZO E. TODD, OF PLATTSMOUTH, NEBRASKA.

SANITARY NON-FREEZING HOG-TROUGH.

1,329,939.  Specification of Letters Patent.  Patented Feb. 3, 1920.

Application filed January 24, 1919. Serial No. 272,844.

*To all whom it may concern:*

Be it known that I, ALONZO E. TODD, a citizen of the United States, residing at Plattsmouth, in the county of Cass, and State of Nebraska, have invented certain new and useful Improvements in Sanitary Non-Freezing Hog-Troughs; and I do hereby declare the following to be a full, clear, and exact description of the invention, such as will enable others skilled in the art to which it appertains to make and use the same.

This invention relates to watering troughs, and the primary object of the invention is to provide an improved watering trough for hogs and the like, which is so constructed that the water therein is prevented from freezing.

Another object of the invention is to provide an improved watering trough for hogs and the like in which the amount of water flowing into the same is controlled by a float valve.

Another object of the invention is to provide an improved watering trough for hogs and the like having a means for heating the water contained therein and for allowing the heat to circulate completely around the tank containing the water.

A still further object of the invention is to provide an improved hog trough of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a perspective view of the improved hog trough.

Fig. 2 is a longitudinal vertical section through the same.

Fig. 3 is a detail vertical section through the valve seat.

Referring to the drawings in detail, wherein similar reference characters designate corresponding parts throughout the several views, the numeral 1 generally indicates the improved trough, which includes a tank 2 and a lower box or casing 3 in which is positioned the lamp or other heating means 4. The upper tank 2 includes the side walls 5, the end walls 6, each of which have an outstanding supporting flange 7, and a lower wall 8. The tank is preferably formed of galvanized iron or other similar sheet metal.

The lower box 3 includes the side walls 9, the end walls 10, and the lower wall 11 and the box is adapted to receive and support the tank 2. The inner sides of the walls 9 and 10 having an inwardly extending strip 12 secured thereto adjacent to the upper edge thereof and this strip is arranged to receive the flange 7 formed on the tank so as to hold the tank in correct position. The strip 12 spaces the walls of the tank from the walls of the casing and permits the heat arising from the lamp 4 or other heating source to completely circulate around the tank. The tank 2 has extending transversely across the same adjacent to one end thereof a strip 13, which has its ends secured to the upper edges of the side walls 9 of the casing 3. The transverse strip 13 supports the depending drop board 14, which extends within a few inches of the metallic bottom 8 of the tank and divides the same into a compartment 15 from which the animals drink and a relatively large compartment 16, which forms the supply tank. A cover 17 is hingedly connected as at 18 to the rear edge of the strip 13 and forms means for closing the compartment 16 and thus prevents the entrance of dirt or the like into the same. A handle 19 is provided whereby the cover may be readily grasped, so as to swing the same open or closed. This cover also forms means whereby the tank may be readily cleaned if so desired and for making repairs to the valve 20, which controls the flow of water from the water supply pipe 21, which extends through registering apertures 22 and 23 formed in the bottom of the lower wall 11 and the bottom 8 into the tank. The drop board 14 prevents cold air from covering the entire surface of the water and helps to prevent the water from freezing and also prevents the entrance of dirt and the like into the main supply tank.

The lamp 4, as clearly shown in Fig. 2 of the drawings, is positioned directly below the compartment 15 from which the animals drink and forms means for preventing the water from freezing, in cold weather. The valve 20 includes the bell crank lever 24 which is pivoted at its angle to a perforated spherical guard 25 by means of a pivot pin 26. The upper end of the pipe 21 has the inner surface thereof beveled to form a valve seat 28 upon which is adapted to seat a valve 29 which is pivotally connected thereto and held in place by the end of the short arm of the bell crank. The free end of the relatively long arm of the bell crank 24 has pivotally connected thereto by means of a pivot pin 30 an upwardly extending arm 31 which is secured to the float 32. Thus it will be seen that when the water reaches a certain height in the tank, the float will be raised, which will force the valve 29 tightly on its seat 28. When the water falls, the float will be gradually lowered and the lower end of the short arm of the bell crank will gradually move out of engagement with the upper surface of the valve and allow the pressure of the water from the pipe 18 to swing the valve on its pivot 26 and thus allow the water to enter into the tank.

A hinged door 33 is provided in one of the side walls 9 and forms means for allowing the lamp to be removed from the lower compartment, when so desired. The door 33 is provided with an opening 34 which permits the entrance of air into the compartment.

From the foregoing description it can be seen that an improved hog trough has been provided, which is exceptionally sanitary and in which the water will absolutely be prevented from freezing during the coldest weather.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

A watering trough comprising a casing having an open top, a supporting strip mounted within the upper portion of said casing, a tank positioned in the upper portion of said casing and having an outwardly directed flange formed thereon and engaged upon the supporting strip with the upper face of the flange flush with the upper edge of the walls of said casing, a transverse strip secured across said casing near one end thereof and across said tank to prevent upward movement of the latter, a drop board carried by said transverse strip to divide the tank into a small open compartment from which the animals may drink and a large feed compartment for supplying water to the small compartment, a cover carried by said transverse strip to close the upper side of said large feed compartment, means for supplying water to said feed compartment, means for regulating the amount of water in said feed compartment, and means for heating the water in said small compartment of the tank.

In testimony whereof I affix my signature in presence of two witnesses.

ALONZO E. TODD.

Witnesses:
D. O. Dwyer,
Mildred Schwenneker.